July 5, 1932.  E. J. COOK  1,866,011
LATCH
Filed Nov. 10, 1930
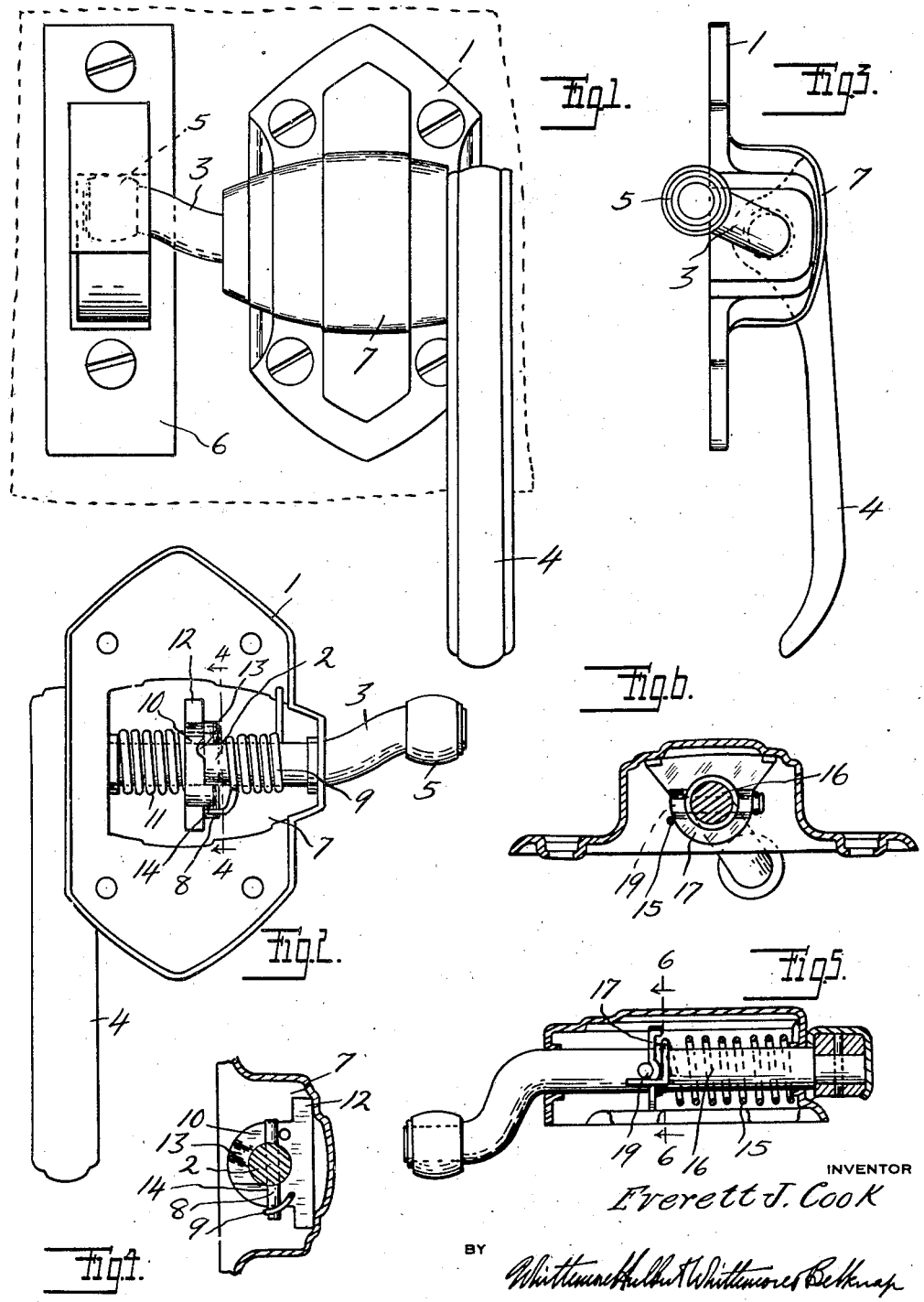
INVENTOR
Everett J. Cook
BY
ATTORNEYS Patented July 5, 1932

1,866,011

UNITED STATES PATENT OFFICE

EVERETT J. COOK, OF TOLEDO, OHIO, ASSIGNOR TO THE DURA COMPANY, OF TOLEDO, OHIO, A CORPORATION OF OHIO

LATCH

Application filed November 10, 1930. Serial No. 494,716.

The invention relates to latches and has for one of its objects the provision of a latch of relatively few parts and of simple construction, which may be manufactured at relatively low cost. Another object is to so construct the latch that its latch arm is directly connected to the shaft, which is adapted to be actuated by the handle. A further object is to so construct the latch that the coil spring means for controlling the operation of the latch encircles the shaft and is positioned thereby. These and other objects of the invention will be apparent from the following description and claims, taken in connection with the accompanying drawing, in which, Figure 1 is a front plan view of the latch, showing an embodiment of my invention;

Figure 2 is a rear plan view thereof;

Figure 3 is an end view thereof;

Figure 4 is a cross section on the line 4—4 of Figure 2;

Figure 5 is a section showing another embodiment of the invention;

Figure 6 is a cross section on the line 6—6 of Figure 5.

The latch illustrated in the present instance is designed for use with refrigerators and comprises the support 1 which is secured to the refrigerator door, the shaft 2 which is journalled on the support, the latch arm 3 which is operatively connected to the shaft and the handle 4 for rotating the shaft. The latch arm is in the nature of a crank integral with the shaft and has journalled on its free end the roller 5 for engaging the keeper 6, which is secured to the refrigerator box. The support 1 has the housing portion 7 in the ends of which the shaft 2 is journalled.

For normally holding the latch arm in its fastening position, there is provided, as shown in Figures 1, 2 and 3, the pin 8 which extends diametrically through the shaft intermediate its ends and the coil spring 9 which encircles the portion of the shaft between the pin and one of the shaft journal supports and which has one end hooked around the pin and the other end engaging the support. For holding the latch arm in either its fastening position or its releasing position there are the collar 10 and the coil spring 11. This collar and coil spring encircle the portion of the shaft on the side of the pin opposite the coil spring 9. The collar has the projecting portions 12 which are engageable with the housing portion 7 to prevent rotation of the collar. The collar is provided with the radially extending recess or groove 13 for receiving the pin 8 in one position of rotative adjustment of the shaft and it is also provided with a shoulder formed by the projection 14 for engaging the pin 8 in another position of rotative adjustment of the shaft. In the first mentioned position of rotative adjustment the latch arm is in its releasing position while in the second mentioned position of rotative adjustment the latch arm is in its fastening position. The coil spring 11 yieldably urges the collar toward the pin at all times to assure engagement of the pin with the recess or groove in the collar and with the shoulder formed on the collar.

In the modification shown in Figures 4 and 5, but one coil spring 15 is employed for rotating the shaft in one direction and for holding the shaft in either of its two predetermined positions to hold the latch arm in either its releasing position or its fastening position. This coil spring encircles the shaft 16 and abuts the collar 17 and one end of the housing portion 18. One end of the coil spring passes beyond the collar 17 and engages the pin 19 extending diametrically through the shaft and the other end of the coil spring is secured to the housing portion. With this arrangement the coil spring yieldably urges the collar 17 toward the pin 19 so that this collar, which is formed of a stamping shaped in the same manner as the collar 10, will properly engage the pin to hold the shaft and consequently the latch arm in either of two positions. At the same time the coil spring tends to rotate the shaft in a direction to rotate or swing the latch arm to its fastening position.

What I claim as my invention is:

1. A latch comprising a support, a shaft journalled on said support, a latch arm operatively connected to said shaft and movable to fastening and releasing positions upon rotative movement of said shaft, a shoulder on and rotatable with said shaft, and yieldably urged means held from rotation and engageable with said shoulder to hold said shaft in one position of rotative adjustment.

2. A latch comprising a support, a shaft journalled on said support, a latch arm operatively connected to said shaft and moveable to fastening and releasing positions upon rotative movement of said shaft, a pin upon said shaft, a collar encircling said shaft and having a recess engageable with said pin to hold said shaft in one position of rotative adjustment, and a coil spring encircling said shaft for urging said collar toward said pin.

3. A latch comprising a support, a shaft journalled on said support, a latch arm directly connected to said shaft, a shoulder on said shaft, a collar encircling said shaft and having a recess engageable with said shoulder for holding said shaft in one position of rotative adjustment, a spring for urging said collar toward said shoulder, and a coil spring encircling said shaft for rotating the same in one direction.

4. A latch comprising a support, a shaft journalled on said support, a latch arm operatively connected to said shaft, a pin on said shaft, a collar encircling said shaft and having a recess engageable with said pin to retain said shaft in one position of rotative adjustment, and a coil spring encircling said shaft and operatively connected to said pin, said coil spring urging said collar toward said pin and tending to rotate said shaft in one direction.

5. A latch comprising a support, a rotatable shaft journaled on said support, a latch arm carried by said shaft, a shoulder on said shaft, a collar encircling said shaft and having a recess engageable with said shoulder for holding said shaft in one position of rotative adjustment, and yieldable means for urging said collar toward said shoulder.

6. A latch comprising a support, a rotatable shaft journaled on said support, a latch arm carried by said shaft, a shoulder on said shaft, a collar encircling said shaft and having a recess engageable with said shoulder for holding said shaft in one position of rotative adjustment, and means for holding said collar against rotation.

7. A latch comprising a support, a rotatable shaft journaled on said support, a latch arm carried by said shaft, a shoulder on said shaft, a collar encircling said shaft and having a recess engageable with said shoulder for holding said shaft in one position of rotative adjustment, and yieldable means for urging said collar toward said shoulder, said collar being provided with a projection engageable with said support for preventing rotation of the collar.

8. A latch comprising a support, a shaft journaled on said support, a latch arm carried by said shaft, a shoulder on said shaft, a member arranged adjacent said shaft and having means engageable with said shoulder to retain said shaft in one position of rotative adjustment, and yieldable means for urging said member toward said shoulder and tending to rotate said shaft in one direction.

9. A latch comprising a support, a shaft journaled on said support, a latch arm carried by said shaft, a shoulder on said shaft, a member arranged adjacent said shaft and having means engageable with said shoulder to retain said shaft in one position of rotative adjustment, and a coil spring encircling said shaft and operatively connected thereto, said coil spring urging said member toward said shoulder and tending to rotate said shaft in one direction.

In testimony whereof I affix my signature.
EVERETT J. COOK.